United States Patent

[11] 3,538,970

[72] Inventor Benjamin H. Shwayder
        Franklin, Michigan
[21] Appl. No. 747,291
[22] Filed July 24, 1968
[45] Patented Nov. 10, 1970
[73] Assignee Shwayder Chemical Metallurgy
        Corporation
        Detroit, Michigan

[54] TIRE STUDS
    2 Claims, 16 Drawing Figs.
[52] U.S. Cl. .................................................. 152/210
[51] Int. Cl. ............................................. B60c 11/16
[50] Field of Search ................................... 152/210

[56] References Cited
    UNITED STATES PATENTS
3,120,863  2/1964  Coate ........................... 152/210
3,230,997  1/1966  Carlstedt ...................... 152/210
3,407,860  10/1968 Mossberg ...................... 152/210
3,124,191  3/1964  Forslund ......................
    FOREIGN PATENTS
253,370    4/1967  Austria ........................ 152/210
1,342,665  9/1963  France ......................... 152/210
12,231     5/1911  Great Britain ................. 152/210
216,618    5/1967  Sweden ......................... 152/210

*Primary Examiner*—Arthur L. La Point
*Attorney*—Cullen, Sloman & Cantor

ABSTRACT: A tire stud having an enlarged head and a narrowed shank, out of which a hardened insert extends, with threads formed upon the circumference of the head for screw threading the stud into an opening formed in a tire surface.

INVENTOR
BENJAMIN H. SHWAYDER
BY Sullen, Sloman, & Cantor
ATTORNEYS

Patented Nov. 10, 1970 3,538,970

INVENTOR
BENJAMIN H. SHWAYDER
BY Cullen, Sloman, & Cantor
ATTORNEYS

TIRE STUDS

BACKGROUND OF INVENTION

Conventional tire studs are formed of a headed, rivetlike portion containing a hardened insert, such as of tungsten carbide, extending out of the shank portion of the rivet. These studs are mounted upon automotive tires which generally are in the form of so-called snow tires having small radial holes arranged in the tread area. The studs are forced into such holes by pressure, such as by pneumatic tools or the like, which press the studs, head first, into the holes to displace the rubber around the heads for thereby retaining the studs in position.

Conventionally, retail outlets selling tires stock various size tires for sale either with or without studs. Should the purchaser want the studs, the retailer, using suitable equipment, presses as many studs as are necessary into the holes formed in the tire thereby providing a studded tire useful for antiskid purposes.

Since the studs must be mounted, one by one, upon the tire, a considerable amount of time, labor and equipment is required for this purpose which results in a relatively high price, beyond the cost of the tire itself, to the consumer.

Hence, an object of this invention is to provide a specially designed tire stud when may be mounted upon the tire without the conventional special equipment so that the consumer may apply the studs himself and thereby avoid the expense of retailer labor or alternatively, the retailer may apply the studs without the expense of maintaining expensive equipment for that purpose.

SUMMARY OF INVENTION

This invention contemplates forming the head of the stud thicker than conventional and with threads formed around its circumference so that the studs may be threadedly inserted into the holes in the tire by twisting the stud, thereby completely eliminating the need for pressure types of equipment for axially forcing the stud into the tire hole. In this manner, simple equipment, such as a screwdriver or a suitable wrench may be used for inserting the studs and the job may then be done by the consumer himself or by anyone, without special equipment.

A further object of this invention is to provide a tire stud having a threaded head for twisting insertion into the receiving holes on a tire and with the shank of the stud suitably configured for roughening whereby the combination of the roughening on the shank and the threads interlocks the stud to the rubber of the tire to thereby prevent loosening or accidental removal. Since a loose stud tends to move relative to the tire and thereby increase the heat of the tire surface, this invention by eliminating such relative movement or by reducing it to a considerable extent, considerably reduces this overheating effect of conventional studs.

This invention further contemplates forming vanes or protuberances upon the insert so that it better locks and secures itself to the surrounding rivet portion to thereby provide a more rigid and better unitary construction.

Summarizing, the tire stud herein includes a rivet portion having a shank and an enlarged, thickened, head portion upon which threads are formed, with surface roughening formed integral with the shank portion, and an insert contained within the rivet, the entire unit being arranged for threadedly engaging into the opening or hole in the tread part of a tire for mounting by twisting rather than by axial pressure and for interlocking with the rubber of the tire.

Further objects and advantages of this invention will become apparent upon reading the following description, of which the attached drawings form a part.

DETAILED DESCRIPTION

Figure 1:
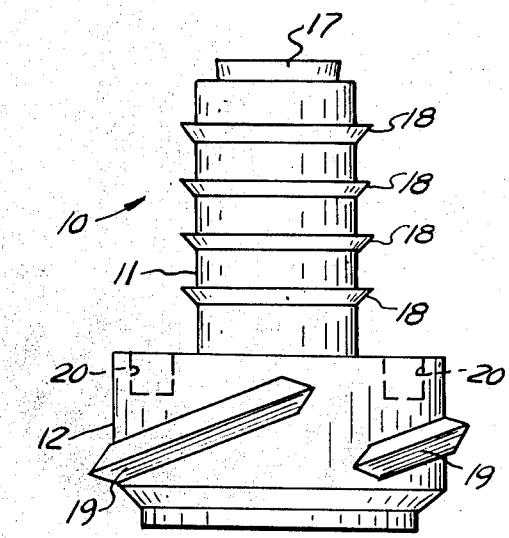
FIG. 1 is an enlarged elevational view of the tire stud herein.
Figure 2:
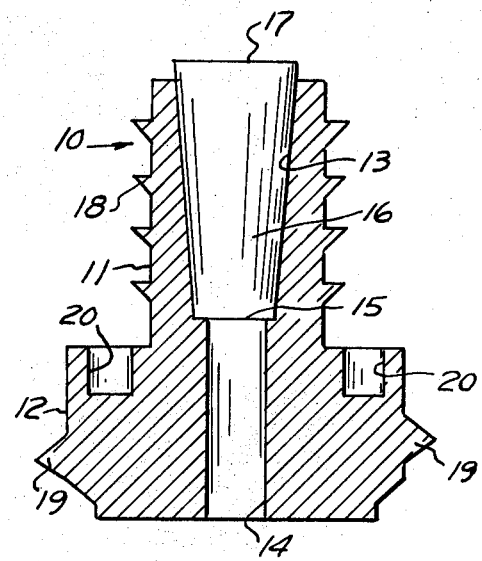
FIG. 2 is a cross-sectional view, similar to FIG. 1, of the tire stud.

Referring to FIGS. 1 and 2, the tire stud 10 comprises an integral shank 11 and thickened, enlarged head 12. The shank and head may be referred to as the rivetlike or rivet portion of the stud.

A central opening extends through the rivet portion, with the opening having an upper, inwardly tapered part 13 and a lower, relatively, straight port 14 of a smaller diameter than the smallest diameter of the upper portion to thereby form an internal, annular shoulder 15.

A tapered insert 16 is arranged to fit within the tapered upper opening part and to abut against the shoulder so that its outer end 17 extends outwardly of the free end of the shank for engagement with the road during use of the tire upon which the stud is mounted.

The insert may be formed of a suitable hardened material, such as the conventionally used tungsten carbide materials and may be secured within the opening either by friction by means of a press fit or by means of a suitable bonding material, such as by brazing or the like.

The surface of the shank 11 is roughened, as for example, by providing continuous annular rings 18 spaced along the length of the shank for interengaging and interlocking with the rubber of the tire.

A thread 19 is formed upon the outer circumference or periphery of the head, which thread may be a single continuous thread or discontinuous portions of a thread. Sockets 20 are formed in the upper surface of the head to receive a turning tool, with the sockets being suitably configured to match the particular tool to be used.

APPLICATION OF STUD TO TIRE

Figure 3:
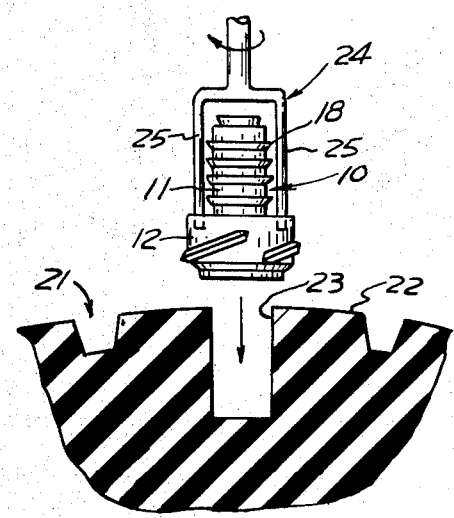
FIGS. 3, 4 and 5 illustrate the successive steps of inserting and retaining the tire stud within a hole formed in an automotive-type tire.
Figure 4:
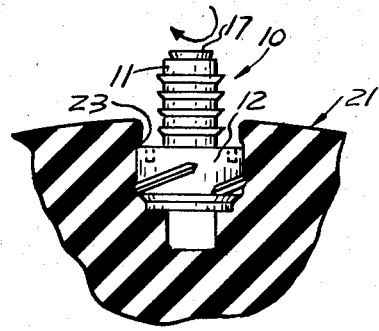
Figure 5:
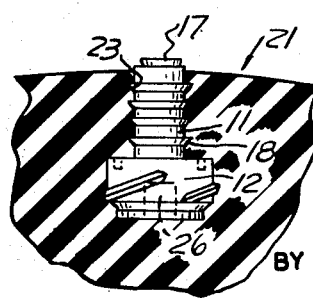

FIGS. 3, 4 and 5 illustrate a portion of a conventional snow-type tire 21 having an outer tread or peripheral portion 22 in which a number of radially directed stud receiving holes 23 have been preformed.

As shown in FIG. 3, by way of example, a forked end rotatable tool 24 having legs 25, whose ends fit within the sockets 20 formed in the head, is rotated and pushed downwardly toward the hole 23 formed in the tire. The hole is of a considerably smaller diameter than the head of the stud and also is of a smaller diameter than the shank 11.

By rotating the tool, as by manual rotation or by use of an ordinary powered drill, the stud is forced into the hole, displacing and causing the rubber of the tire to plastically flow around it, as illustrated in FIG. 4. Ultimately, the stud bottoms in the hole with excess rubber at the head portion plastically flowing into the stud hole portion 14 as illustrated by 26 in FIG. 5. Now the stud is surrounded by the rubber of the tire which interlocks with the thread 19 and the roughening rings 18 to tightly grip and hold the stud in position and against relative movement with the tire. The end 17 of the insert extends outwardly of the peripheral surface of the tire for engaging with the road surface and thereby functioning to increase the antiskid properties of the tire.

The rings 18, being sloped upwardly, relatively easily engage into the hole, but having flat upper edges, interlock with the rubber tightly enough to prevent the studs from being pulled out or thrown out during movement of the tire.

The hole portion 14 also serves as an access opening for salvaging the inserts from used or broken studs by means of pushing it upwardly out of the rivet by means of a suitable punch.

MODIFICATIONS OF SHANK SURFACE ROUGHENINGS

Figure 6:
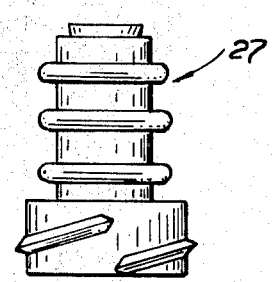
FIGS. 6, 7 and 8 illustrate modifications of the surface roughening formed upon the shank of the stud.

FIG. 6 shows a modified form of surface roughening for the shank, namely, rounded edged rings 27 formed integral with the shank.

Figure 7:
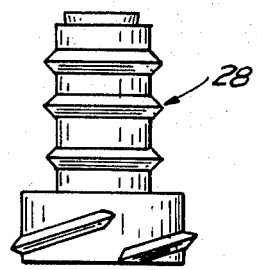

FIG. 7 shows a different form of ring 28 having relatively sharp edges for biting into the rubber. The rings here may be formed as either discontinuous, spaced apart rings, or as a continuous thread like that of a screw.

Figure 8:
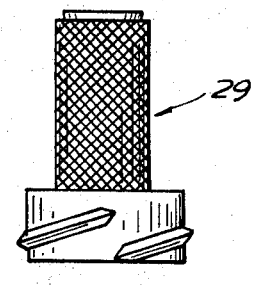

FIG. 8 illustrates a deep knurling 29 formed upon the surface of the shank for frictionally engaging the rubber.

MODIFIED RIVET

Figure 9:
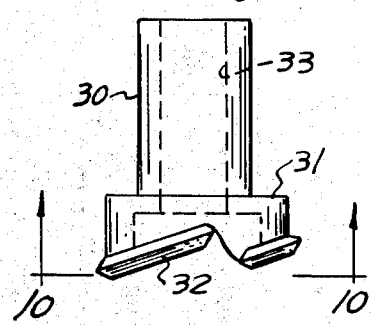
FIG. 9 is an elevational thereon. of a modification of the head and threads formed thereon.
Figure 10:
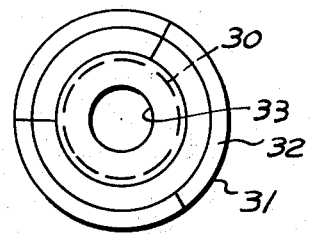
FIG. 10 is an end view taken in the direction of arrows 10–10 of FIG. 9.

FIGS. 9 and 10 illustrate a rivet 30, having the lower end of its enlarged head 31 formed into the thread 32. This rivet may be made of sheet metal, die formed into the shape formed with a central opening 33 and by means of suitably rolling the free edge of the head, the threads may be formed as illustrated.

MODIFIED GRIPPING MEANS

Figure 11:
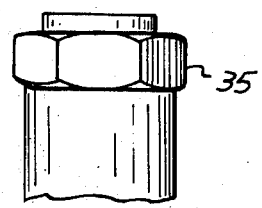
FIG. 11 is an enlarged, fragmentary view of the upper portion of a tire stud showing a modification in the gripping means.

FIG. 11 illustrates a hex nut configuration 35 formed integral with the upper end of the shank of the rivet so that the rivet may be gripped by a suitably sized socket wrench, which may be attached to a hand twist tool or to a power drill for thereby inserting the rivet into the hole in the tire.

Figure 12:
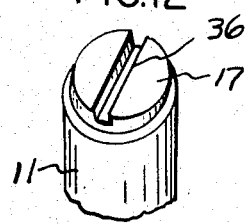
FIG. 12 is a fragmentary, perspective view showing a further modified gripping means in the form of a screwdriver-type receiving slot.

Alternatively, as shown in FIG. 12, a screwdriver slot 36 may be formed in the end 17 of the insert so that the user may simply screw the stud into the tire hole by twisting it with an ordinary screwdriver until it bottoms within the hole.

MODIFIED INSERTS

Figure 13:
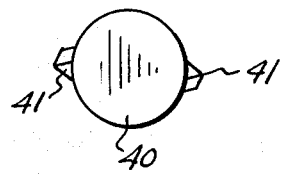
FIG. 13 is a top, plan view of a modified form of insert.
Figure 14:
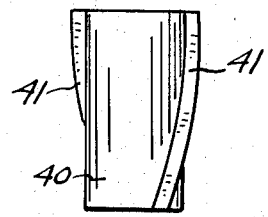
FIG. 14 is an elevational view of the insert of FIG. 13.

Rather than using the tapered insert illustrated in FIG. 2, the insert may be formed of a cylindrical portion 40 having outwardly extending, thin, vanes, 41 as illustrated in FIGS. 13 and 14. The number of vanes may be varied, such as 1, 2, 3 or 4 and to better increase the gripping power of the vanes, they may be spiralled slightly along the length of the insert. Here, the insert is press-fitted into the corresponding opening of the rivet and the vanes will bite into and frictionally engage the inner wall surface of the opening of the rivet to thereby tightly lock to the rivet to form a unitary, substantially nonseparable construction.

Figure 15:
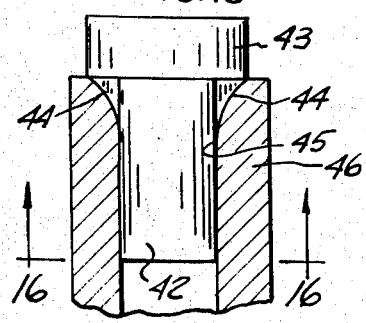
FIG. 15 is a further modification of the form of the insert shown in elevation and with a fragmentary portion of the rivet.
Figure 16:
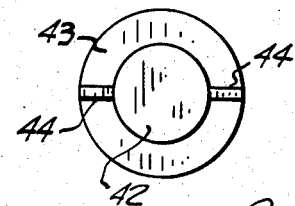
FIG. 16 is an end view of the insert of FIG. 15, taken as if in the direction of arrows 16–16 of FIG. 15.

An alternate insert construction, shown in FIGS. 15 and 16, contemplates an insert stem 42 with an enlarged head 43 and shortened, thin side vanes 44. The stem is arranged within the opening 45 of the rivet shank 46 so that the head overlaps and substantially covers the end of the shank while the vanes bite into the shank wall for thereby locking the shank and the insert together.

This invention may be further developed within the scope of the following claims. Accordingly, it is desired that the foregoing description be read as being merely illustrative of an operative embodiment of this invention, and not in a strictly limited sense.

I claim:

1. A tire stud comprising a rivet portion having an enlarged, circular in cross section head and an integral shank having a central through bore with a hardened insert arranged within said bore and extending outwardly of the free end of the shank; a massive radially outwardly extending single-turn thread formed integral upon the outer periphery of said head and extending nearly the full length of the head for screw threadedly engaging with the wall of a radially directed hole formed in a rubberlike tire for thereby advancing the stud into the hole and frictionally locking and holding the stud within said hole.

2. A tire stud as defined in claim 1 and at least one radially outwardly extending, thin vane formed integral with said insert and extending the length thereof; said insert biting into the wall defining the bore in said shank for frictionally interlocking the insert and the shank.